Jan. 14, 1969  YOSHITAKA SAKAI  3,421,783
SHOCK-ABSORBING KEY FOR ROTARY BODY
Filed Aug. 30, 1967

INVENTOR
Yoshitaka SAKAI
BY *Jues and Seenside*
ATTORNEY 3,421,783
SHOCK-ABSORBING KEY FOR ROTARY BODY
Yoshitaka Sakai, Nagoya, Japan, assignor to Sakai
 Manufacturing Co. Ltd., Nagoya, Japan, a corporation of Japan
Filed Aug. 30, 1967, Ser. No. 664,328
U.S. Cl. 287—52.05    2 Claims
Int. Cl. F16d 1/06

ABSTRACT OF THE DISCLOSURE

A shock-absorbing key capable of transmitting rotation of a rotary shaft elastically to a cooperating rotary body, said shock-absorbing key consisting of a hollow, circular, deformable coil spring to be fitted in an axial cylindrical hollow or key was defined by a semicylindrical cavity formed in the exterior wall of said rotary shaft axially thereof and a semicylindrical cavity formed in the interior wall of said rotary body axially thereof.

BACKGROUND OF THE INVENTION

Field of the invention

The present invention relates to a shock-absorbing key through which rotation of a rotary shaft is transmitted elastically to a cooperating rotary body.

Description of the prior art

In securing a rotary body to a rotary shaft on which said rotary body is mounted, it has been the normal practice heretofore to insert a bar-shaped key in a key way, said key generally being in a rectangular shape in cross section. However, use of a key of the type described has not only necessitated some degree of machining to be performed during the assembling work to obtain snug fitting of the key in the key way, but also required a skill of the workman. Particularly, those slotted keys which are caused to slide frequently during operation, have called for a complicate structure and laborious machining for securing adequate lubrication so as to avoid seizure. Moreover, since these keys were rigid and were not capable of absorbing a shock, they were frequently subjected to deformation, with the consequent play or wear of the same, under a repeated stress caused by variation in load on starting or stopping of or during the power transmission operation, thus rendering the connection between the rotary shaft and cooperating rotary body incomplete.

Summary of the invention

The present invention has been achieved with a view to eliminating the foregoing drawbacks of the conventional keys and arrived at upon noting the fact that a coil spring performs a shock-absorbing function by being deformed elastically, as a load is applied to the side wall thereof.

According to the present invention, there is provided an improved key of the type described which consists of a hollow, circular, deformable coil spring to transmit rotation of a rotary shaft elastically to a cooperating rotary body therethrough, said coil spring being fitted in a cylindrical axial hollow or key way defined by a semicylindrical cavity of a predetermined length formed axially in the interior wall of a bushing mounted in the rotary body and a corresponding semicylindrical cavity of the same length formed axially in the exterior wall of the rotary shaft.

Description of the preferred embodiment

Figure 1:
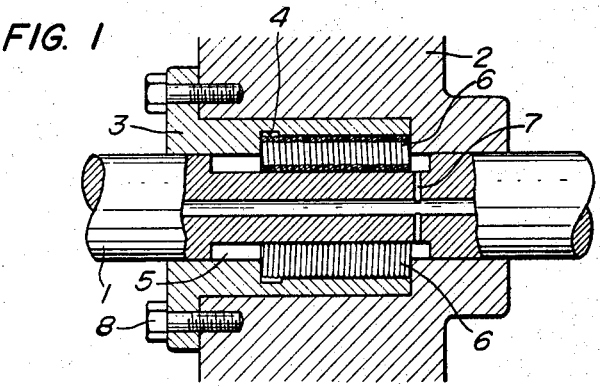
FIGURE 1 is a cross sectional side view, partly in elevation, showing the connection between a rotary shaft and a cooperating rotary body, using the shock-absorbing key of the instant invention.
Figure 2:
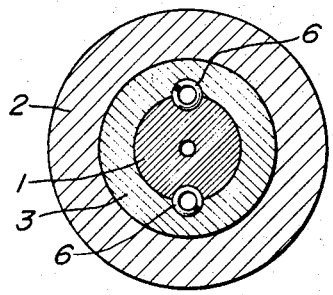
FIGURE 2 is a cross sectional front view of FIGURE 1.
Figure 3:
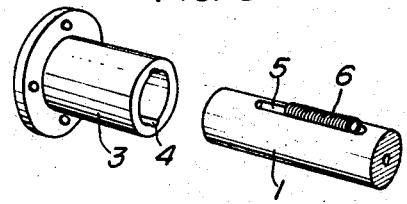
FIGURE 3 is an exploded perspective view of the associated parts.

Referring to the drawing, the rotary shaft 1 has semicylindrical cavities 5 formed axially in the exterior wall thereof. The rotary body 2 has a flanged bushing 3, fitted in the axial hollow thereof and integrated therewith by means of bolts 8 extending through the flange portion. In the interior wall of the bushing 3 are formed axially thereof semicylindrical cavities 4 in a manner such that, when the rotary body 2 is mounted on the rotary shaft 1 through the intermediary of the bushing 3, the semicylindrical cavities 4 form cylindrical hollows together with the respective semicylindrical cavities 5 in the exterior wall of the rotary shaft. A hollow, circular, deformable coil spring 6 is mounted in each of the cylindrical hollows thus formed. Reference numeral 7 designates passages for lubrication oil.

Figure 4:
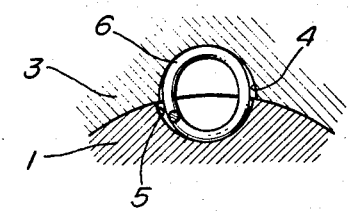
FIGURE 4 is an enlarged cross sectional view illustrating the function of the shock-absorbing key of the invention during operation.

With the structure described, it will be obvious that rotation of the rotary shaft 1 is transmitted to the rotary body 2 through the coil spring 6. When the load varies during operation, imposing a repeated stress on the coil spring, the coil spring is deformed elastically in its circular shape, due to the elasticity thereof, and thereby the shock caused is absorbed and mitigated by said coil spring. Thus, it is possible to prevent the rotary shaft as well as the rotary body from being damaged. Since, in this case, the deformation of the coil spring is within the elastic limit thereof, a slight offsetting of the mating cavities 4 and 5 (as shown in FIG. 4), possibly caused by the shock, does not in any manner interfere with the power transmission. In addition, because of being a coil spring, the key of this invention is not susceptible to damage under varying load, is highly durable and is completely free from the drawback of coming off the key way upon loosening, as has been possessed by the conventional keys. Furthermore, it is sufficiently capable of power transmission while maintaining the positive connection between the rotary body and the rotary shaft. It is also to be noted that, by employing the improved key of this invention, the structure can be simplified and the assembling work is rendered so easy as not to require any special skill.

I claim:

1. A force transmitting device for rotary motion comprising a rotary shaft having a groove formed therein; a second element having a complementary groove formed therein, said groove and said complementary groove adapted to be placed into register to form a recess; and a coil spring located in said recess, said shaft being provided with lubricating passages communicating with said recess adapted for passage of a lubricant into said recess.

2. A device according to claim 8, wherein said second element is in the form of a sleeve and the device comprises a hollow rotary body surrounding said sleeve.

References Cited
UNITED STATES PATENTS
| | | |
|---|---|---|
| 1,234,213 | 7/1917 | Reno. |
| 1,418,447 | 6/1922 | Leipert. |
| 2,332,270 | 10/1943 | Shaw _____ 287—52.05 |

FOREIGN PATENTS
| | | |
|---|---|---|
| 247,716 | 2/1926 | Great Britain. |
| 263,871 | 9/1927 | Great Britain. |
| 273,334 | 1/1928 | Great Britain. |

CARL W. TOMLIN, *Primary Examiner.*

ANDREW V. KUNDRAT, *Assistant Examiner.*

U.S. Cl. X.R.

287—53